(12) United States Patent
Hebert et al.

(10) Patent No.: US 12,655,326 B2
(45) Date of Patent: Jun. 16, 2026

(54) CONDUCTIVE PATTERNS AND METHODS THEREOF

(71) Applicant: 3M INNOVATIVE PROPERTIES COMPANY, St. Paul, MN (US)

(72) Inventors: Larry S. Hebert, Hudson, WI (US); Scott A. Boyd, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/719,026

(22) PCT Filed: Dec. 7, 2022

(86) PCT No.: PCT/IB2022/061909
§ 371 (c)(1),
(2) Date: Jun. 12, 2024

(87) PCT Pub. No.: WO2023/126723
PCT Pub. Date: Jul. 6, 2023

(65) Prior Publication Data
US 2025/0051618 A1 Feb. 13, 2025

Related U.S. Application Data

(60) Provisional application No. 63/293,904, filed on Dec. 27, 2021.

(51) Int. Cl.
*C09J 7/40* (2018.01)

(52) U.S. Cl.
CPC ......... *C09J 7/405* (2018.01); *C09J 2203/326* (2013.01); *C09J 2301/122* (2020.08);
(Continued)

(58) Field of Classification Search
CPC C09J 7/405; C09J 2203/326; C09J 2301/122; C09J 2301/204; C09J 2301/302;
(Continued)

(56) References Cited

U.S. PATENT DOCUMENTS

| | | |
|---|---|---|
| 2,466,963 A | 4/1949 | Patrick et al. |
| 2,789,958 A | 4/1957 | Fettes et al. |

(Continued)

FOREIGN PATENT DOCUMENTS

| | | | |
|---|---|---|---|
| EP | 2774173 B1 | 4/2020 | |
| WO | WO-2011063082 A2 * | 5/2011 | ............... B32B 7/06 |

(Continued)

OTHER PUBLICATIONS

International Search report for PCT International Application No. PCT/IB2022/061909, mailed on Mar. 3, 2023, 4 pages.

*Primary Examiner* — Patricia L. Nordmeyer
(74) *Attorney, Agent, or Firm* — Carlos M. Téllez Rodríguez; 3M Innovative Properties Company

(57) ABSTRACT

Provided is an electrically-conductive assembly and methods thereof. The electrically-conductive assembly includes a release liner having a major surface, a conductive layer extending across a portion of the major surface according to a pre-determined shape, a pressure-sensitive adhesive layer disposed between the release liner and the conductive layer. The pressure-sensitive adhesive layer can be mutually coextensive with the conductive layer. An insulating layer is disposed on the conductive layer and the release liner, such that the conductive layer and the pressure-sensitive adhesive layer are captured between the insulating layer and the major surface of the release liner. The provided assembly can sustain an electrical current to carry signals or distribute power in layered composite structures.

13 Claims, 7 Drawing Sheets

(52) U.S. Cl.
CPC .... *C09J 2301/204* (2020.08); *C09J 2301/302* (2020.08); *C09J 2301/314* (2020.08); *C09J 2400/16* (2013.01); *C09J 2400/28* (2013.01)

(58) Field of Classification Search
CPC .............. C09J 2301/314; C09J 2400/16; C09J 2400/28; C09J 7/29; H05K 3/20; H05K 3/207; H05K 2201/09236
See application file for complete search history.

(56) References Cited

U.S. PATENT DOCUMENTS

| | | | | |
|---|---|---|---|---|
| 3,240,647 A | * | 3/1966 | Morgan | ................. H05K 3/041 |
| | | | | 29/829 |
| 3,355,545 A | * | 11/1967 | Kilduff | .................... H01B 5/14 |
| | | | | 29/829 |
| 3,497,383 A | * | 2/1970 | Stow | ........................... C09J 7/29 |
| | | | | 428/209 |
| 4,165,425 A | | 8/1979 | Bertozzi | |
| 4,281,092 A | | 7/1981 | Breazeale | |
| 4,366,307 A | | 12/1982 | Singh et al. | |
| 4,609,762 A | | 9/1986 | Morris et al. | |
| 5,082,147 A | | 1/1992 | Jacobs | |
| 5,225,472 A | | 7/1993 | Cameron et al. | |
| 5,277,734 A | | 1/1994 | Bayer | |
| 5,527,861 A | | 6/1996 | Logothetis | |
| 5,610,243 A | | 3/1997 | Vietti et al. | |
| 5,912,319 A | | 6/1999 | Zook et al. | |
| 5,959,071 A | | 9/1999 | DeMoss et al. | |
| 6,172,179 B1 | | 1/2001 | Zook et al. | |
| 6,509,418 B1 | | 1/2003 | Zook et al. | |
| 6,709,748 B1 | | 3/2004 | Ho et al. | |
| 2019/0051999 A1 | | 2/2019 | Coakley et al. | |
| 2021/0301181 A1 | | 9/2021 | Kwon et al. | |

FOREIGN PATENT DOCUMENTS

| | | | | |
|---|---|---|---|---|
| WO | WO-2015116652 A1 | * | 8/2015 | ............... C09J 7/38 |
| WO | WO-2016028746 A1 | * | 2/2016 | ............... C09J 7/38 |
| WO | WO-2021124038 A1 | * | 6/2021 | ............... C09J 7/38 |

* cited by examiner

CONDUCTIVE PATTERNS AND METHODS THEREOF

CROSS REFERENCE TO RELATED APPLICATIONS

This application is a national stage filing under 35 U.S.C. 371 of PCT/IB2022/061909, filed 7 Dec. 2022, which claims the benefit of U.S. Provisional Patent Application No. 63/293,904, filed 27 Dec. 2021, the disclosure of which is incorporated by reference in its/their entirety herein.

FIELD OF THE INVENTION

Provided are electrically-conductive assemblies, along with methods of manufacture and use thereof. Such articles and assemblies may be incorporated into primary vehicular structures.

BACKGROUND

Modern vehicles are becoming more electrified than ever before. Electrification has made it possible to improve performance while reducing greenhouse gas emissions and noise. The emergence of electric cars has illuminated the many possibilities and benefits associated with powering vehicles using electricity. Moreover, like its counterparts in the automotive field, aircraft are also becoming increasingly electrified as systems and monitoring functions have become more sophisticated.

These benefits are accompanied by their own unique technical challenges. Electrical wires can be heavy. Further, each wire must be insulated from the surrounding environment for electrical isolation, corrosion protection, and personnel safety. Each wire must be strong enough to support its own weight in the impact and vibratory environment of an aircraft. Wires may need to be supported at relatively short intervals along its length to avoid abrasion and other destructive factors. Depending on the application, wires may need to be carefully positioned relative to other wires and various electric field sources to avoid electromagnetic interference and coupling.

SUMMARY

Provided herein are electrically-conductive assemblies capable of embedding conductors within a layered composite structure, such as fiber reinforced plastic composites. The embedded conductors are capable of carrying an electrical current to transmit signals or distribute power. They can be used to form conductive strips, or ribbons, within the layered material. These conductive ribbons can be embedded within a fiber-reinforced plastic composite, whereby the conductor is fully supported by the composite, requires minimal to no additional insulation, eliminates need for clamps or brackets for support, and avoids abrasion and contact with fluids.

Moreover, fiber reinforced plastic composite parts in the aerospace industry are increasingly fabricated using automated means, as opposed to manual layups, to reduce manufacturing costs, improve quality, and increase production rates. Advantageously, the provided solution can embed conductors in a fiber-reinforced composite in a configuration that is compatible with these automated manufacturing methods.

The provided electrically-conductive assemblies and methods enable processing of long (e.g., having a length exceeding 1 meter) conductor patterns for flexible circuits useful as ribbon-like wire harnesses, antennae, electromagnetic shields, or anywhere long conductive elements are needed. These types of circuits utilize long slender conductive elements. These elements must be controlled to exacting relative positions throughout the processing of the material for proper electrical performance. The pressure-sensitive adhesive holds the conductors to the liner during cutting, lamination, and encapsulation, and the pressure-sensitive adhesive releases from the liner to allow the undesired part, or weed portion, to be easily removed in stripping operations.

In a first aspect, an electrically-conductive assembly is provided. The electrically-conductive assembly comprises: a release liner having a major surface; a conductive layer extending across a portion of the major surface according to a pre-determined shape; a pressure-sensitive adhesive layer disposed between the release liner and the conductive layer, the pressure-sensitive adhesive layer being mutually coextensive with the conductive layer; and an insulating layer disposed on the conductive layer and the release liner, wherein the conductive layer and the pressure-sensitive adhesive layer are captured between the insulating layer and the major surface of the release liner.

In a second aspect, a method of using the electrically-conductive assembly is provided, the method comprising: removing the release liner from the pressure-sensitive adhesive layer; adhering the pressure-sensitive adhesive layer to a substrate; and connecting the conductive layer to an electrical circuit.

In a third aspect, a method of making an electrically-conductive assembly is provided, comprising: disposing a pressure-sensitive adhesive between a conductive layer and a release liner; selectively removing a pre-determined area of the conductive layer and an underlying area of the pressure-sensitive adhesive layer while retaining an underlying area of the release liner to obtain a discontinuous shape of the conductive layer extending over a continuous major surface of the release liner; and disposing an insulating layer on both the discontinuous shape and an exposed portion of the continuous major surface of the release liner to capture the conductive layer and the pressure-sensitive adhesive layer between the insulating layer and the continuous major surface of the release liner.

Figure 1:
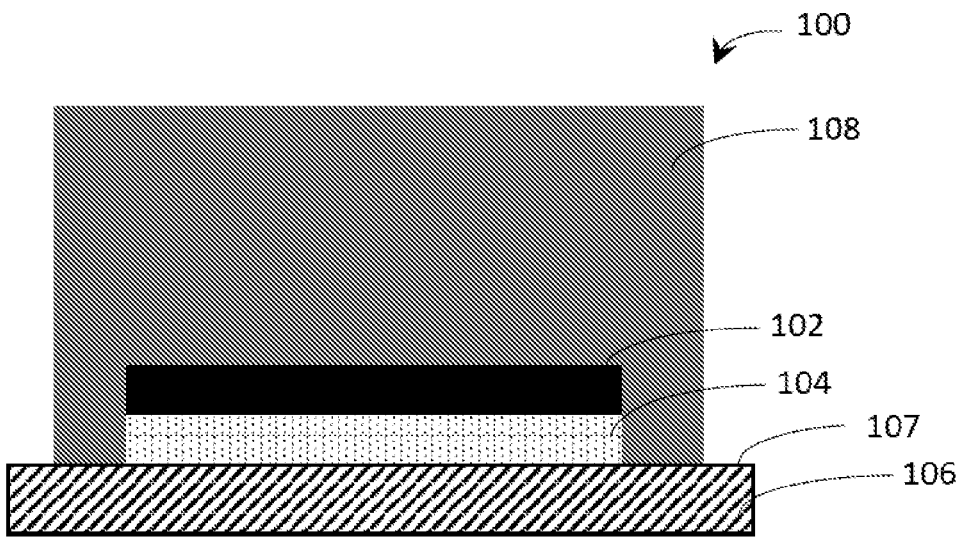
FIGS. 1 and 2 are side cross-sectional views of electrically-conductive assemblies according to two exemplary embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:

"ambient conditions" means at 25° C. and 101.3 kPa pressure;

"average" means number average, unless otherwise specified;

"conductive" means electrically-conductive;

"continuous" means extending across a single, unified area along a given layer (a perforated sheet can be continuous);

"cure" refers to exposing to radiation in any form, heating, or allowing to undergo a physical or chemical reaction that results in hardening or an increase in viscosity;

"discontinuous" means extending across a plurality of discrete areas along a given layer, where the discrete areas are spaced apart from each other;

"polymer" refers to a molecule having at least one repeating unit and can include copolymers;

"size" refers to the longest dimension of a given object or surface;

"substantially" means to a significant degree, as in an amount of at least 50%, 60, 70, 80, 90, 95, 96, 97, 98, 99, 99.5, 99.9, 99.99, or 99.999%, or 100%; and "thickness" means the distance between opposing sides of a layer or multilayered article.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

The present disclosure is directed to conductor patterns capable of being used in flexible circuits. Such flexible circuits can be implemented in wiring harnesses, antennae, electromagnetic shielding, or any application in which long conductive elements can be advantageously used. The composite articles include a plurality of layers.

An electrically-conductive assembly according to one exemplary embodiment is shown in FIG. 1 and hereinafter referred to by the numeral 100. In this view, the assembly 100 is in the form of a continuous tape, with the layers of the assembly 100 shown in cross-section and viewed along the longitudinal axis of the tape.

The assembly 100 is comprised of a plurality of layers, including a conductive layer 102, an adhesive layer 104, and a release liner 106. In preferred embodiments, the adhesive layer 104 is a pressure-sensitive adhesive layer. As shown, the conductive layer 102 and adhesive layer 104 are mutually coextensive, such that the perimeters of these layers have substantially the same shape and size. As further shown in FIG. 1, the release liner 106 has a major surface 107, with the conductive layer 102 and adhesive layer 104 collectively extending over less than the entire major surface 107 of the release liner 106.

The thickness of the adhesive layer 104 is not restricted, and can be from 2 micrometers to 300 micrometers, from 5 micrometers to 200 micrometers, from 30 micrometers to 130 micrometers, or in some embodiments, less than, equal to, or greater than 2 micrometers, 3, 4, 5, 7, 10, 12, 15, 17, 20, 25, 30, 35, 40, 45, 50, 60, 70, 80, 90, 100, 110, 120, 150, 170, 200, 250, or 300 micrometers.

Optionally, the conductive layer 102 and adhesive layer 104 are discontinuous layers, while the release liner 106 is a continuous layer. Based on the desired application, the conductive layer 102 and adhesive layer 104 can extend across a portion of the major surface 107 according to a pre-determined shape. The pre-determined shape need not be especially limited, but can include for example rectilinear patterns such as stripes, geometric shapes, curves, spiral patterns, and combinations thereof.

Extending over the conductive layer 102, adhesive layer 104, and release liner 106 is an insulating layer 108. Since the major surface 107 extends beyond the perimeter of the pre-determined shape, the conductive layer 102 and the adhesive layer 104 are captured between the insulating layer 108 and the major surface 107 of the release liner 106, in which the interface between the adhesive layer 104 and the release liner 106 is coplanar with the interface between the insulating layer 108 and the release liner 106. Optionally, the conductive layer 102 can extend across the major surface 107 according to a plurality of pre-determined shapes, where the plurality of pre-determined shapes are discontinuous.

In the present embodiment, the conductive layer 102 and the adhesive layer 104 are substantially encapsulated between the insulating layer 108 and the major surface 107 of the release liner 106. The insulating layer 108 can alternatively extend along less than the entire perimeter of the conductive layer 102 and/or adhesive layer 104, such as along up to 99 percent, up to 97 percent, up to 95 percent, or less than, equal to, or greater than 50 percent, 55, 60, 65, 70, 75, 80, 85, 90, 95, 97, 98, 99, or 100 percent of the perimeter of the conductive layer 102 and/or adhesive layer 104.

To serve its insulating function and adequately seal the conductive layer 102 from the outside environment, the insulating layer 108 preferably has a thickness significantly greater than the combined thicknesses of the conductive layer 102 and adhesive layer 104. The thickness of the insulating layer 108 can be from 8 micrometers to 1050 micrometers, from 15 micrometers to 700 micrometers, from 140 micrometers to 500 micrometers, or in some embodiments, less than, equal to, or greater than 8 micrometers, 9, 10, 11, 12, 15, 17, 20, 25, 30, 35, 40, 45, 50, 60, 70, 80, 90, 100, 110, 120, 130, 140, 150, 170, 200, 250, 300, 350, 400, 450, 500, 600, 700, 800, 900, 1000, or 1050 micrometers.

Figure 2:
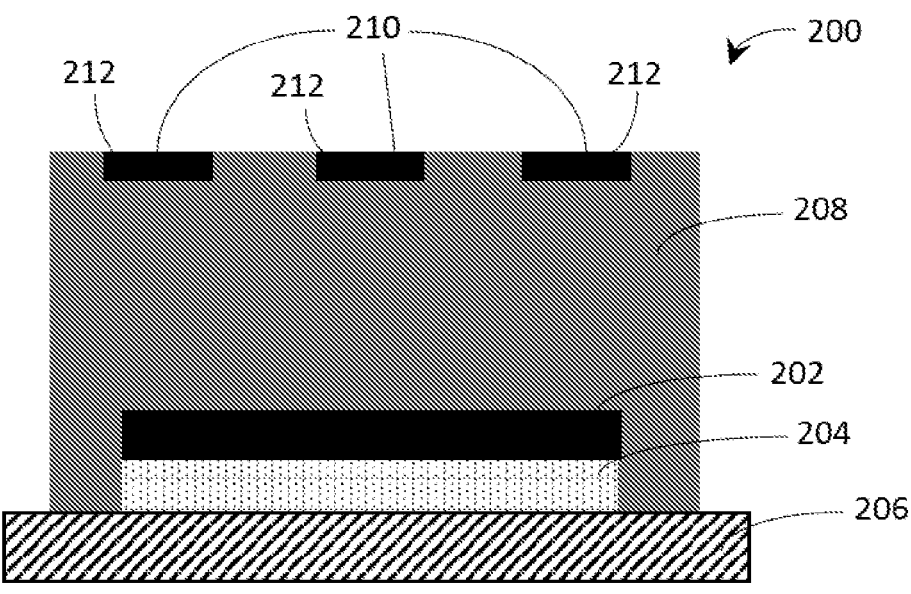

FIG. 2 show an alternative assembly 200 which incorporates a separate conductive layer. The assembly 200 includes a continuous release liner 206, and a first conductive layer 202 and adhesive layer 204 disposed thereon. Like in assembly 100, the conductive layer 202 and adhesive layer 204 are mutually coextensive and an insulating layer 208 extends over both layers, such that the conductive layer 202 and adhesive layer 204 are fully embedded within the assembly 200. In the depicted embodiment, the assembly 200 further includes a second conductive layer 210 disposed on the insulating layer 208 and spaced apart from the first conductive layer 202.

Optionally and as shown, the second conductive layer 210 is a discontinuous layer. Here, the second conductive layer 210 is comprised of three discrete, parallel conductive ribbons, although any number of other configurations, both continuous and discontinuous, are also possible. The second conductive layer 210 is partially embedded in the insulating layer 208 such that only the top surfaces 212 of the second conductive layer 210 are exposed along the top major surface of the assembly 200. To facilitate processing and storage of the assembly 200, the top surfaces 212 and the top major surface of the assembly 200 can be coplanar.

Figure 3:
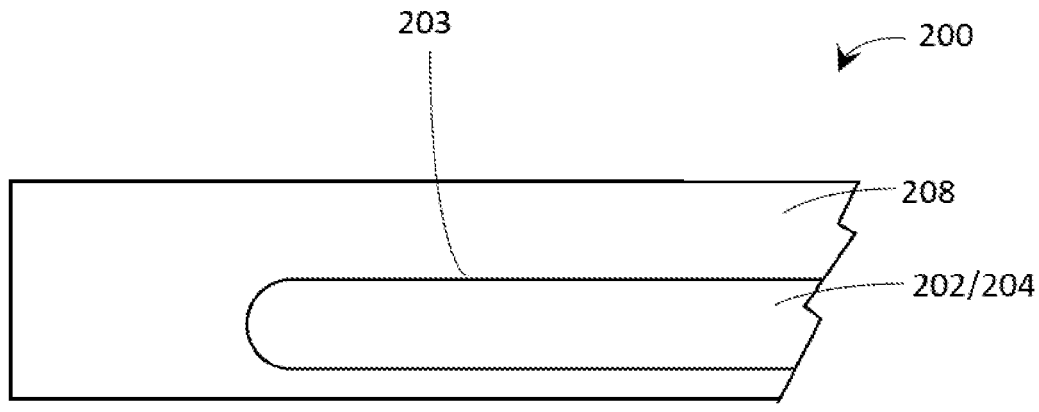
FIG. 3 is a fragmentary plan view of the assembly of FIG. 2, looking toward its bottom surface.

FIG. 3 shows the assembly 200 in a plan view from below. Visible in this illustration is the bottom major surface of insulating layer 208 and the coplanar exposed surfaces of the adhesive layer 204. The assembly 200 represents a bondable tape that is continuous, allowing for convenient manufacturing, storage and dispensing by the end user. The adhesive layer 204 and corresponding conductive layer 202 share a peripheral edge 203, with the insulating layer 208 directly contacting the peripheral edge 203 of both the conductive layer 202 and the adhesive layer 204.

Advantageously, the continuous format of assembly 200 can enable its deployment in emergent automated tape layup ("ATL") and automated fiber placement ("AFP") manufacturing operations within the aerospace industry.

Figure 4:
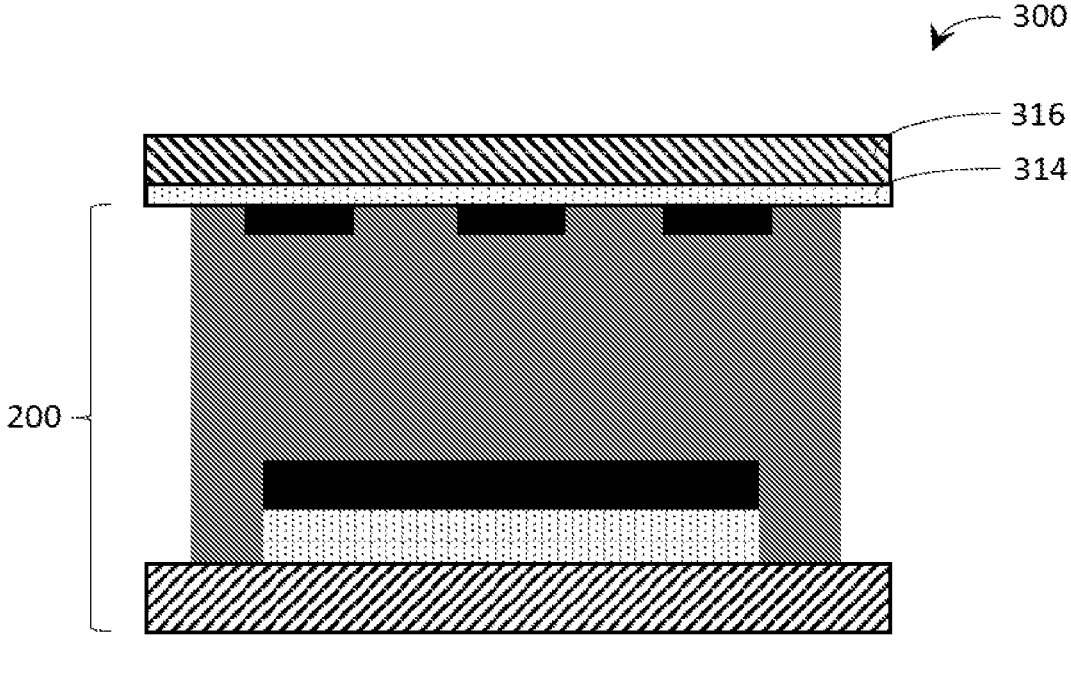
FIG. 4 is a side cross-sectional view of an electrically-conductive assembly according to still another exemplary embodiment.

FIG. 4 shows still another embodiment of an electrically-conductive assembly 300. The assembly 300 is obtained by bonding the assembly 200 to a second release liner 316 using a second adhesive layer 314 as illustrated. The assembly 300 has an adhesive disposed on each of its major surfaces upon removal of the release liners, making it suitable for fabricating multilayered constructions.

Conductive Layers

The conductive layer 102 can be made from any of a number of electrically-conductive materials. Suitable conductive materials may be monolithic in nature. Monolithic materials include metal layers of, for example, copper, aluminum, titanium, silver, gold, tin, nickel or an alloy or combination thereof. Metal conductors may be obtained from continuous metal foils. Metal foils may be unperforated or perforated to provide weight savings.

Perforated metal foils, also referred to as foraminous foils, may be made by any known method, including expanding, perforating, cutting, drilling, or plating. Expanded metal foils, for example, are made by slitting a metal foil and then stretching transversely or longitudinally to create a staggered, two-dimensional array of perforations. Foraminous foils need not be characterized by a regularly repeating pattern of holes.

Useful metal layers can an areal density of from 0.02 gsm to 1000 gsm, 4 gsm to 500 gsm, 4 gsm to 350 gsm, or in some embodiments, less than, equal to, or greater than 0.02 gsm, 0.05, 0.1, 0.2, 0.5, 0.7, 1, 2, 5, 7, 10, 15, 20, 25, 30, 35, 40, 45, 50, 60, 70, 80, 90, 100, 150, 200, 250, 300, 350, 400, 450, 500, 600, 700, 800, 900, or 1000 gsm.

Alternatively, the conductive layer 102 can be made by dispersing electrically-conductive particles in a matrix resin. Conductive particles can be in the form of spheres, chopped fibers, or flakes. The matrix resin, which is generally not electrically-conductive, can be composed of a polymeric resin, including a thermoset or a thermoplastic resin. Common thermoset resins are epoxy resins, but vinyl ester-based resins, phenolics, bismaleimide, or cyanate ester can also be used. Curatives for these resins are known in the art and can be incorporated into the polymeric resin.

Useful thermoplastic resins include polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetherether-ketone (PEEK), polyetherketoneketone (PEKK), and combinations thereof.

The conductive particles or sheets are not particularly limited and can be comprised of electrically-conductive particles or sheets of carbon, glass and/or nylon. Suitable sheets include papers or weaves of electrically-conductive fibers. Carbon fiber is, by itself, weakly conductive. Non-conductive particles and sheets can be made conductive by coating with an electrically-conductive metal-usually silver, gold, tin, copper, nickel or alloys thereof. Examples of these include metallized glass or metallized nylon. If desired, conductive fibers and particles can both be incorporated into the same conductive layer.

The matrix resin is preferably loaded with conductive particles or sheets at sufficient amounts to impart substantial electrical conductivity along the length of the conductive layer. The loading of the conductive particles or sheets in the matrix resin can be from 3% to 50%, from 3% to 35%, from 5% to 15%, or in some embodiments, less than, equal to, or greater than 3%, 5, 7, 10, 15, 20, 25, 30, 35, 40, 45, or 50% by weight relative to the overall weight of the conductive layer 102.

As a further option, the conductive layer 102 could have a hybrid construction in which a monolithic conductor such as a perforated or unperforated metal foil is used in combination with a matrix resin containing electrically-conductive particles or sheets.

The conductive layer can be made flat and quite thin to preserve flexibility of the layer, while retaining its capacity to carry an electrical current with much less current loss or much less loss of signal clarity than is capable by the surrounding fiber-reinforced composite. Depending on the particulars of the application and other dimensions of the conductive layer, the average thickness of the conductive layer can be from 4 micrometers to 350 micrometers, from 6 micrometers to 250 micrometers, from 8 micrometers to 150 micrometers, or in some embodiments, 4 micrometers, 5, 6, 7, 8, 9, 10, 12, 15, 17, 20, 22, 25, 27, 30, 35, 40, 45, 50, 60, 70, 80, 90, 100, 150, 200, 300, or 350 micrometers.

Insulating Layers

In various embodiments, the insulating layer is a reaction product of a curable resin. Useful curable resins can include macromonomers, or oligomers, capable of chemically reacting to form part of a crosslinked network. The curable resin can be a polysulfide, polythioether, 1,3-diene, silicone, fluorocarbon, fluoroelastomer, fluorosilicone, epoxy, maleimide, polycyanate ester, polyurethane precursor, or any mixture or copolymer thereof. Particular resins are described in more detail below.

Polythioethers include thioether linkages (i.e., —S—) in their backbone structures. Polysulfides include disulfide linkages (i.e., —S—S—) in their backbone structures. Polythiols may contain an alkylene, arylene, alkylarylene, arylalkylene, or alkylenearylalkylene having more than one thiol group. Any of the alkylene, alkylarylene, arylalkylene, or alkylenearylalkylene can be optionally interrupted by one or more ether (i.e., —O—), thioether (i.e., —S—), or amine (i.e., —NR$_1$—) groups and optionally contain substituted alkoxy or hydroxyl groups. Useful monomeric polythiols may be dithiols or polythiols containing three thiol groups, four thiol groups, or more than four thiol groups.

In some embodiments, the polythiol is an alkylene dithiol. Exemplary dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedithiol, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. Polythiols having more than two thiol groups include propane-1,2,3-trithiol; 1,2-bis[(2-mercaptoethyl)thio]-3-mercaptopropane; tetrakis(7-mercapto-2,5-dithiaheptyl) methane; and trithiocyanuric acid. Combinations of any of these or with any of the dithiols mentioned above are also possible.

Polythioethers can be prepared, for example, by reacting dithiols with dienes, diynes, divinyl ethers, diallyl ethers, ene-ynes, or combinations of these under free-radical conditions. Useful reagents for making polythioethers include any of the dithiols, dienes, diynes, divinyl ethers, diallyl ethers, and ene-ynes listed above. Examples of useful polythioethers are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.).

In some embodiments, the polythioether is represented by Formula I:

$$HS—R_3—[S—(CH_2)_2—O[—R_4—O-]_m—(CH_2)_2—S—R_3—]_n—SH \quad (I),$$

wherein each of R$_3$ and R$_4$ is independently a C$_{2-6}$ alkylene, which may be straight-chain or branched, C$_{6-8}$ cycloalkylene, C$_{6-10}$ alkylcycloalkylene, —[(CH$_2$—)$_p$—X—]$_q$—(—CH$_2$—)$_r$, in which at least one —CH$_2$— is optionally substituted with a methyl group, X is one selected from the group consisting of O, S and —NR$_5$—, R$_5$ denotes hydrogen or methyl, m is a number from 0 to 10, n is a number from 1 to 60, p is a number from 2 to 6, q is a number from 1 to 5, and r is a number from 2 to 10.

Polythioethers with more than two thiol groups may be used. Any of the curing agents and methods described below in connection with at least partially curing the compositions disclosed herein may also be used for preparing the polythioethers. In some embodiments, a thermal free-radical initiator described below is combined with the dithiols and dienes, diynes, divinyl ethers, diallyl ethers, ene-ynes, or combinations of these, and the resulting mixture is heated to provide the polythioethers.

Polythioethers can be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups.

In some embodiments, the diepoxide is a bisphenol diglycidyl ether, in which the bisphenol (i.e., —O—C$_6$H$_5$—CH$_2$—C$_6$H$_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by Formula II:

$$—S—R_3—S—CH_2—CH(OH)—CH_2—O—C_6H_5—CH_2—C_6H_5—O—CH_2—CH(OH)—CH_2—S—R_3—S— \quad (II),$$

wherein R$_3$ is as defined above, and the bisphenol unit (i.e., —O—C$_6$H$_5$—CH$_2$—C$_6$H$_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl.

Polysulfides can be prepared by the condensation of sodium polysulfide with bis-(2-chloroethyl) formal, which provides linear polysulfides having two terminal thiol groups. Branched polysulfides having three or more thiol groups can be prepared using trichloropropane in the reaction mixture. Examples of useful polysulfides are described, for example, in U.S. Pat. No. 2,466,963 (Ferguson et al); U.S. Pat. No. 2,789,958 (Fettes et al); U.S. Pat. No. 4,165,425 (Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", and "LP-541."

Polythioethers and polysulfides can have a variety of useful molecular weights. In some embodiments, the polythioethers and polysulfides have number average molecular weights of at least 500 g/mol, at least 750 g/mol, at least 1000 g/mol, at least 1500 g/mol, or at least 2000 g/mol. In some embodiments, the polythioethers and polysulfides have number average molecular weights of up to 20,000 g/mol, up to 15,000 g/mol, up to 10,000 g/mol, up to 7500 g/mol, or up to 5000 g/mol.

Other curable resins are also viable for use in the flowable encapsulant. For example, polymers of 1,3-dienes may also be used. These include curable resins derived from isoprene and butadiene, along with their copolymers such as butadiene-acrylonitrile, butadiene-styrene, and isoprene isobutylene. The cured products of 1,3-dienes and their derivatives can be used in a wide range of commercially useful elastomeric materials.

The curable resin may also be based on a silicone resin. Silicone resins are characterized by their characteristic —(Si—O)— repeat units, and may be cured to form elastomeric, crosslinked networks. The curing of oligomeric silicones can be carried out using any known method, including addition polymerization, condensation polymerization, peroxide polymerization, and oxime polymerization.

Addition polymerization can involve the reaction of a silicone hydride and a vinyl group. In this reaction, an ethyl group ($CH_2$—$CH_2$) is formed, without any byproducts. In this reaction, two separate components are generally mixed to catalyze the polymers: a base component containing a hydride- and a vinyl-functional siloxane polymer, and a curative component containing a platinum complex. When mixed, the hydride- and vinyl-functional siloxane polymers can react to create an ethyl bridge between them.

Condensation polymerization, commonly catalyzed by a suitable acid or base, can occur when one or more crosslinkers that hydrolyze and then progressively react with hydrolysable groups on the silicone resin or other crosslinkers to produce a crosslinked network. Crosslinkers include alkoxy, acetoxy or oxime silanes such as methyl trimethoxy silane for alkoxy-curing systems and methyl triacetoxysilane for acetoxy-curing systems. Optionally, an additional condensation catalyst is added to fully cure the silicone rubber system and achieve a tack-free surface. Organotitanate catalysts such as tetraalkoxy titanates or chelated titanates are used in alkoxy-cured systems. Tin catalysts such as dibutyl tin dilaurate (DBTDL) can be used in oxime and acetoxy-cured systems.

Alternatively, silicone resins containing vinyl groups can also be cured using a free radical polymerization route with the assistance of a curing agent, such as an organic peroxide. Typically, these curing reactions occur at elevated temperatures, and thus can be useful in extrusion or injection molding applications. Peroxides known for this purpose include dicumyl peroxide and dichlorobenzoyl peroxide.

The curable resin may also include any known fluoropolymer resin, such as a perfluoroelastomer. In some embodiments, the fluoropolymer resin is curable using a peroxide and coagent. In other embodiments, the fluoropolymer resin is cured by a catalyzed reaction of nitrile groups.

For example, the fluoropolymer can be a perfluoroelastomer containing nitrile groups. As disclosed for example in U.S. Pat. No. 5,527,861 (Logothetis), a perfluoroelastomer which contains a sufficient amount of nitrile groups can function as cure sites to crosslink the perfluoroelastomer. The nitrile groups can be introduced through the use of a nitrile containing cure site monomer, whereby the nitrile groups are introduced into the polymer during polymerization. Suitable polymers are described in, for example, U.S. Pat. No. 4,281,092 (Breazeale).

As another option, the curable resin can include one or more epoxy resins. Epoxy resins are known in the art and include compounds or mixtures of compounds that contain one or more epoxy groups. The compounds can be saturated or unsaturated, aliphatic, alicyclic, aromatic, or heterocyclic, or can comprise combinations thereof. In some embodiments, the curable resin includes a compound containing more than one epoxy group (e.g., a polyepoxide).

Polyepoxides can include aliphatic or aromatic polyepoxides. Aromatic polyepoxides can be used, for example, for high temperature applications. Aromatic polyepoxides are compounds containing at least one aromatic ring structure (e.g. a benzene ring) and more than one epoxy group, such as polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. An aromatic polyepoxide can be a polyglycidyl ether of a polyhydric phenol. Aromatic polyepoxides can include glycidyl esters of aromatic carboxylic acids, for example, phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, for example, N,N-diglycidylbenzeneamine, bis(N,N-diglycidyl-4-aminophenyl) methane, 1,3-bis(N,N-diglycidylamino)benzene, and N,N-diglycidyl-4-glycidyloxybenzeneamine, and mixtures thereof; and the polyglycidyl derivatives of polyhydric phenols, for example, 2,2-bis-[4-(2,3-epoxypropoxy)phenyl]propane, the polyglycidyl ethers of polyhydric phenols such as tetrakis(4-hydroxyphenyl) ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl) methane, polyglycidyl ethers of novolacs (reaction products of monohydric or polyhydric phenols with aldehydes in the presence of acid catalysts), and mixtures thereof. The polyglycidyl ethers of polyhydric phenols can be the diglycidyl ethers of bisphenol that have pendant carbocyclic groups, such as 2,2-bis[4-(2, 3-epoxypropoxy)phenyl]norcamphane, 2,2-bis[4-(2,3-epoxypropoxy)phenyl]decahydro-1,4,5,8-dimethanonaphthalene, or 9,9-bis[4-(2,3-epoxypropoxy)phenyl]fluorene.

Aliphatic polyepoxides can include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3", 4"-epoxycyclohexane-1,3-dioxane, bis(3,4-epoxycyclohexylmethyl) adipate, the diglycidyl ester of linoleic dimer acid, 1,4-bis(2,3-epoxypropoxy) butane, 4-(1, 2-epoxyethyl)-1,2-epoxycyclohexane, 2,2-bis(3,4-epoxycyclohexyl) propane, polyglycidyl ethers of aliphatic polyols such as glycerol or hydrogenated 4,4'-dihydroxydiphenyldimethylmethane, and mixtures thereof.

As another option, the curable resin may include one or more maleimide resins. Maleimide resins can include bismaleimides, polymaleimides, or polyaminobismaleimides, such as N,N'-bismaleimides. The N,N'-bismaleimide can be a N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with bismaleimides can include any of a wide variety of unsaturated organic compounds, such as those having multiple unsaturation (e.g., ethylenic, acetylenic, or both). Examples include acrylic acids and amides and the ester derivatives thereof, for example, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2- methoxyphenol; triallyl trimellitate; divinyl benzene; dicy-clopentadienyl acrylate; dicyclopentadienyloxyethyl acrylate; 1,4-butanediol divinyl ether; 1,4-dihydroxy-2-butene; styrene; o-methyl styrene; chlorostyrene; p-phenyl-styrene; p-methylstyrene; t-butylstyrene; and phenyl vinyl ether. Resins including bismaleimide in combination with a bis(alkenylphenol) can be used, such as 4,4'-bismaleimido-diphenylmethane and o,o'-diallyl bisphenol A.

As another option, the curable resin may include one or more polycyanate ester resins. Exemplary polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmeth-ane, and the dicyanates prepared from bisphenol A, bisphe-nol F, or bisphenol S. Tri- and higher functionality cyanate resins can be used. To improve flexibility of reaction prod-ucts derived from polycyanate esters, these resins can be blended or copolymerized with other resins such as epoxy resins.

As yet another option, the curable resin may contain one or more polyurethane precursor resins. Polyurethane precur-sor resins include polyols, or long flexible polymeric seg-ments that contain two or more hydroxyl groups per mol-ecule. These polyols can be reacted with polyisocyanates, such as an aliphatic isocyanate or aromatic isocyanate, to form urethane linkages in a covalently-bonded polymeric network.

In some embodiments, the polyisocyanate component contains three or more isocyanate groups and thus enable crosslinking of the flowable encapsulant when reacted with a difunctional polyol (or diol). In some embodiments, the polyol component contains three or more hydroxyl groups to enable crosslinking of the encapsulant when reacted with a difunctional polyisocyanate (or diisocyanate). It is also possible for both of the polyol and polyisocyanate compo-nents to have three or more of its respective functional groups above. For the purposes of this disclosure, either polyols or isocyanates could be broadly construed as curable resins suitable for use in the flowable encapsulant.

Useful polyols can have a number average molecular weight in the range of from 30 g/mol to 3000 g/mol. Optionally, a mixture of two or more polyols are used. An exemplary mixture can include one or more diols which serve as chain extenders, along with one or more triols and/or polyols having a functionality greater than 3, which serve as crosslinkers. Polyols that may be used in the curable resin can include polyesters, polycarbonates, polyacrylates, polyalkylenes, and polyethers, or combinations thereof.

Further aspects of polyurethane precursor resins are described in, for example, U.S. Pat. No. 5,082,147 (Jacobs) and U.S. Pat. No. 6,709,748 (Ho et al.).

Methods of Manufacture and Use

Figure 5:
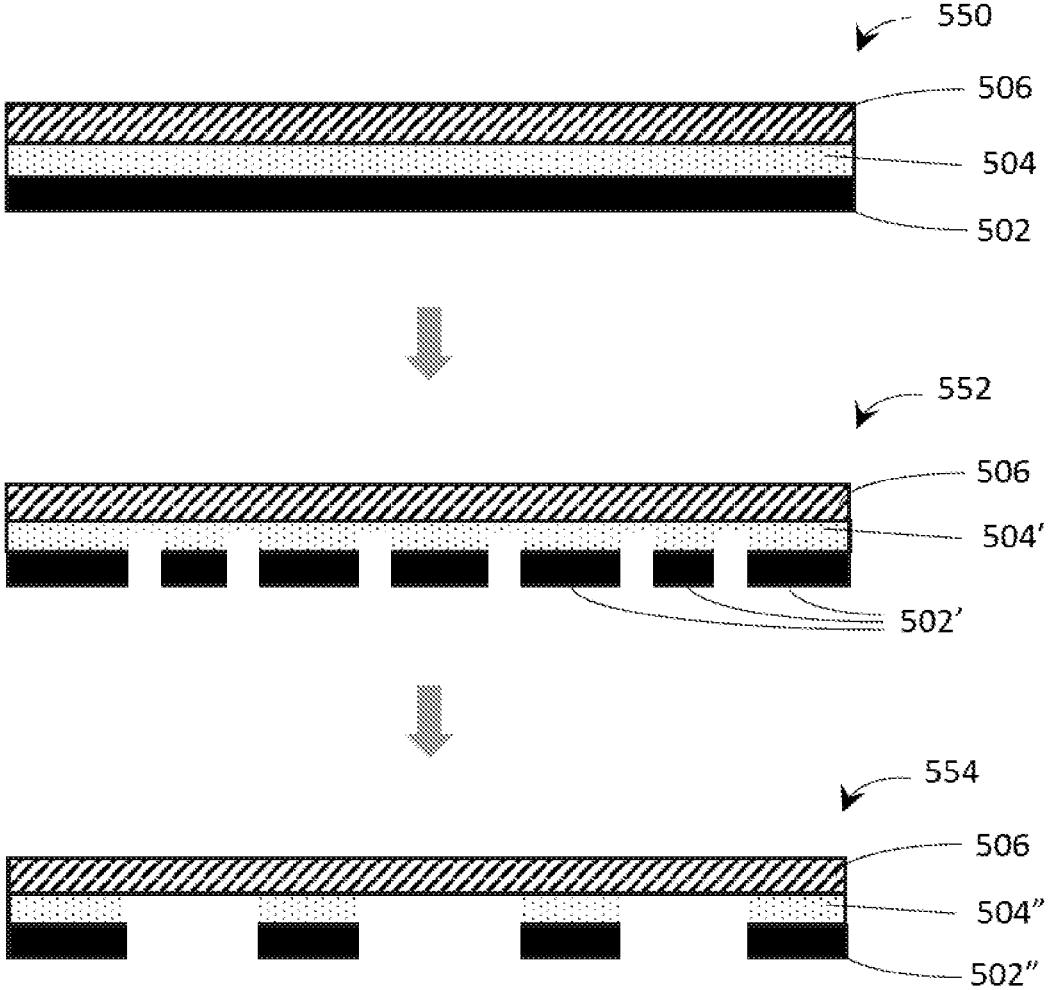
FIGS. 5-7 show respective first, second and third stages in an exemplary process for making an electrically-conductive assembly.

FIG. 5 shows a process flow diagram that shows an exemplary method of making a discontinuous electrically-conductive assembly. In various embodiments, the discon-tinuous electrically-conductive assembly can be a patterned assembly comprised of a series of replicated subassemblies. Each of the replicated subassemblies can include one or more electrically-conductive layers, each having its own pre-determined shape.

In step 550, a bonded assembly 520 is provided by using an adhesive layer 504 to adhere a conductive layer 502 to a release liner 506. At this stage, each of the adhesive layer 504, conductive layer 502, and release liner 506 is a con-tinuous layer. The adhesive layer 504, conductive layer 502, and release liner 506 may be coextensive layers and laminated to each other using, for example, a continuous, roll-to-roll manufacturing process.

Step 552 shows the selective removal of certain areas of the conductive layer 502 and adhesive layer 504 to obtain a converted conductive layer 502' and converted adhesive layer 504'. The converted conductive layer 502' is discon-tinuous and appear as illustrated as a plurality of electrically-conductive islands that are spaced apart from each other. These islands preferably have a respective pre-determined shapes that are based on the needs of the particular appli-cation. Corresponding underlying areas of the pressure-sensitive adhesive layer are also selectively removed. The release liner 506, however, remains unmodified, thus pro-viding a plurality of discontinuous shapes of the converted conductive layer 502' extending over a continuous major surface of the release liner 506.

The process for selectively removing portions of the conductive layer 502 and adhesive layer 504 can be imple-mented using any of a number of technologies, including laser etching, mechanical drilling, machining milling, and water jet cutting. Particularly preferred are removal tech-nologies that are fast, accurate and can achieve precise control over the depth of material removed. In the example depicted in FIG. 5, the depth of the adhesive layer 504 removed in the converting process was less than the thick-ness of the adhesive layer 504. Alternatively, the depth of removal could be equal to the above thickness. It is permis-sible for a small portion of the release liner 506 to be removed so long as the release liner 506 remains continuous.

In a preferred embodiment, the portions conductive layer 502 and adhesive layer 504 removed represent an outline the desired shapes of a desired conductive pattern. Said another way, the removed portions define lines on the major surface of the layered assembly that demarcate between desired portions of the converted conductive layer 502' and unde-sired portions of the converted conductive layer 502'. The undesired portions of the converted conductive layer 502' are not needed for the end application and are thus com-monly referred to as weed portions.

In step 554, the weed portions of the converted conductive layer 502' and corresponding portions of the underlying adhesive layer 504' are then collectively peeled away from the release liner 506, leaving behind only the desired por-tions of the converted conductive layer 502' and correspond-ing portions of the underlying adhesive layer 504'. As represented in FIG. 5, the remaining layers on the release liner 406 are weeded conductive layer 502" and weeded adhesive layer 504". Although not illustrated in the figure, an small amount of the adhesive layer 504' may remain on the release liner 406 in the gaps between desired portions of the weeded adhesive layer 504". The amount of this residual adhesive is generally insignificant.

Figure 6:
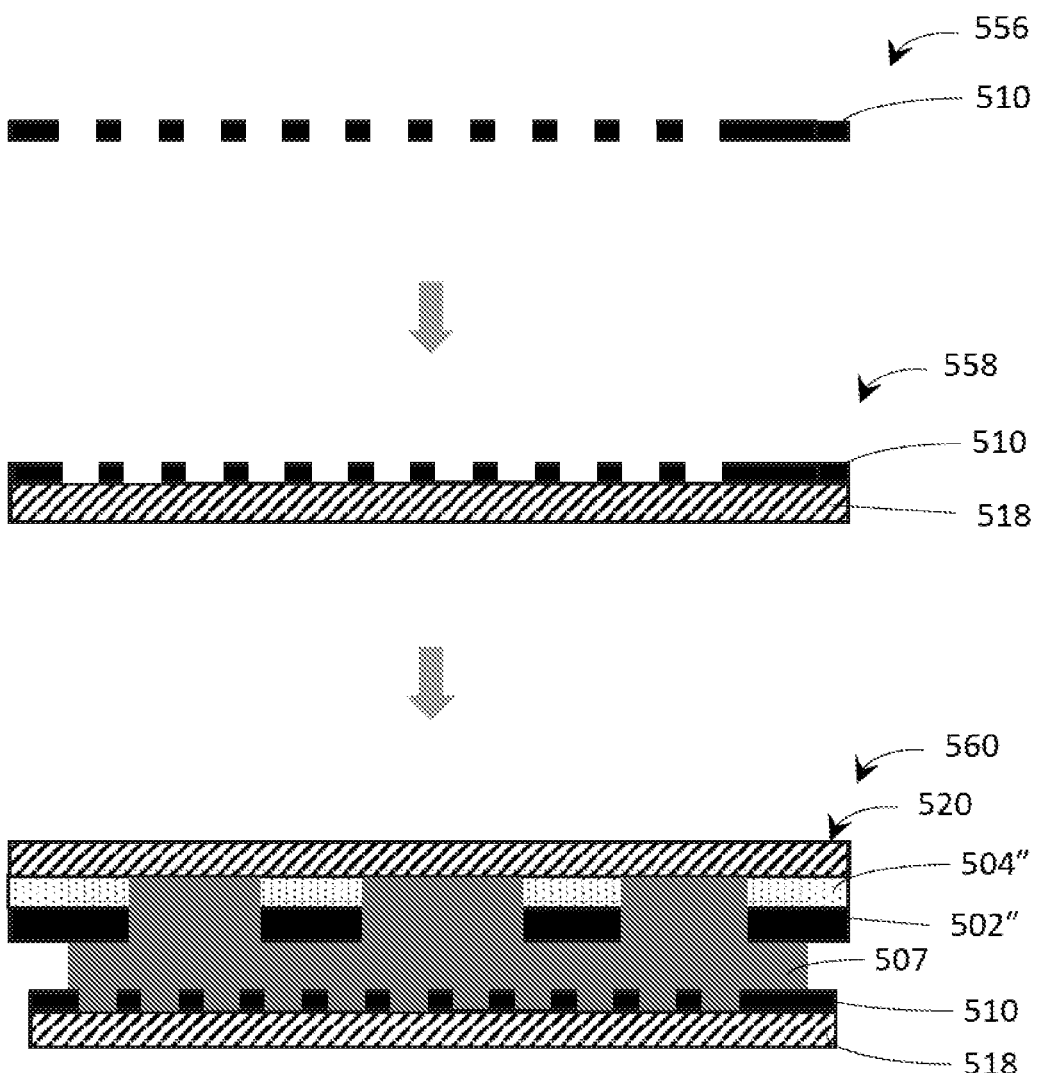

FIG. 6 shows a continuation of the process flow diagram from FIG. 5. In step 556, a conductive layer 510 is provided. Optionally and as shown, the conductive layer 510 is a foraminous layer and can be made of any of the electrically-conductive materials previously described. In step 558, the conductive layer 510 is laminated to a sacrificial carrier layer 518, which serves to prevent a flowable material (such as a curable encapsulant resin) applied to the top major surface of the conductive layer 510 from extruding beyond the bottom major surface of the conductive layer 510.

Carrier layer 518 is generally a continuous layer, or combination of layers, each of which can be made from any suitable material. Such materials generally include paper and polymeric film compositions commercially available for use in pre-mask applications. Suitable polymeric resins include thermoplastic resins. Useful thermoplastic resins include polyurethane, polyvinylidene fluoride, terpolymer of tetrafluoroethylene, hexafluoropropylene and vinylidene fluoride (THV), terpolymer of hexafluoropropylene, tetrafluoroethylene and ethylene (HTE), polyetherimide, polyetherether-ketone (PEEK), polyetherketoneketone (PEKK), and combinations thereof. If the thermoplastic resin does not naturally adhere to the conductive layer 510, then an additional pressure-sensitive adhesive layer may be provided (which would be part of the overall carrier layer 518 as depicted).

In step 560, a flowable encapsulant 507 is then provided between the assemblies made in step 554 (in FIG. 5) and step 558. The resulting semi-finished bonded assembly 520 disposes the flowable encapsulant 507 between the discontinuous shapes of the weeded conductive layer 502" and an exposed portion of the release liner 506 to capture the weeded conductive layer" and the weeded pressure-sensitive adhesive layer 504" between the flowable encapsulant 507 and the continuous major surface of the release liner 506.

Figure 7:
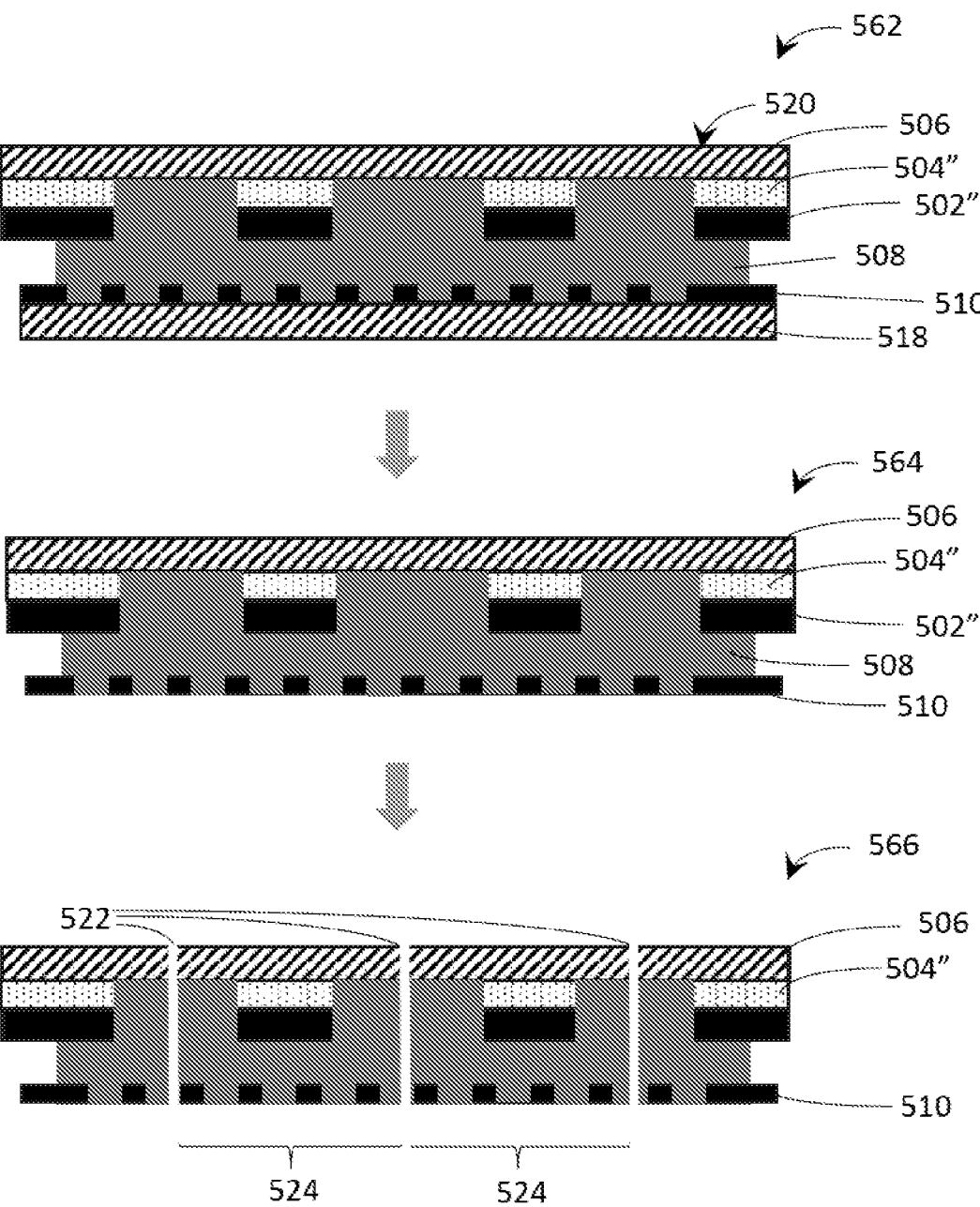

FIG. 7 shows a continuation of the process flow diagram of FIG. 6. In step 562, the semi-finished assembly 520 is subjected to conditions sufficient to cure or otherwise harden the flowable encapsulant 507, thereby providing an insulating layer 508. Such conditions need not be particularly limited. In some embodiments, curing of the flowable encapsulant 507 include application of heat by conduction, radiation, or convection. Alternatively, curing could be achieved by exposure to actinic radiation such as ultraviolet or visible light. Actinic radiation may be transmitted through the release liner 506 to cure the flowable encapsulant 507 if the release liner 506 is transparent to the spectral output of the radiation.

In the following step 564, the carrier layer 518 is removed from the conductive layer 510. In final step 566, the semi-finished assembly 520 is then slit lengthwise along the vertical cut lines 522 as shown to provide finished assemblies 524 having a desired width. The edge pieces of the slitted sub-assembly, as shown, are imperfect and can be discarded. The finished assemblies 524 can then be continuously wound onto a roll for storage and transport.

The provided electrically-conductive assemblies can be used by removing the release liner from the pressure-sensitive adhesive layer, adhering the pressure-sensitive adhesive layer to a substrate, and connecting the conductive layer to an electrical circuit. The electrical circuit can include a power supply that transmits an electric current through the conductive layer of the assembly. Besides use in power distribution applications, the conductive layer may also be used as an antenna, to transmit information or generate electromagnetic fields, or as part of a Faraday cage for shielding interior components from static electric fields.

It is possible for the substrate itself to be a pressure-sensitive adhesive. This application could be useful where it is desired to augment the number of layers in the electrically-conductive assembly, or to attach the electrically-conductive assembly to a surface of the structure. Where the conductive layer is aligned longitudinally along the length of an adhesive tape or ribbon, it can be advantageous to build layer upon layer to convey an electric current along different directions and along overlapping paths across the major surface of the assembly.

Figure 8:
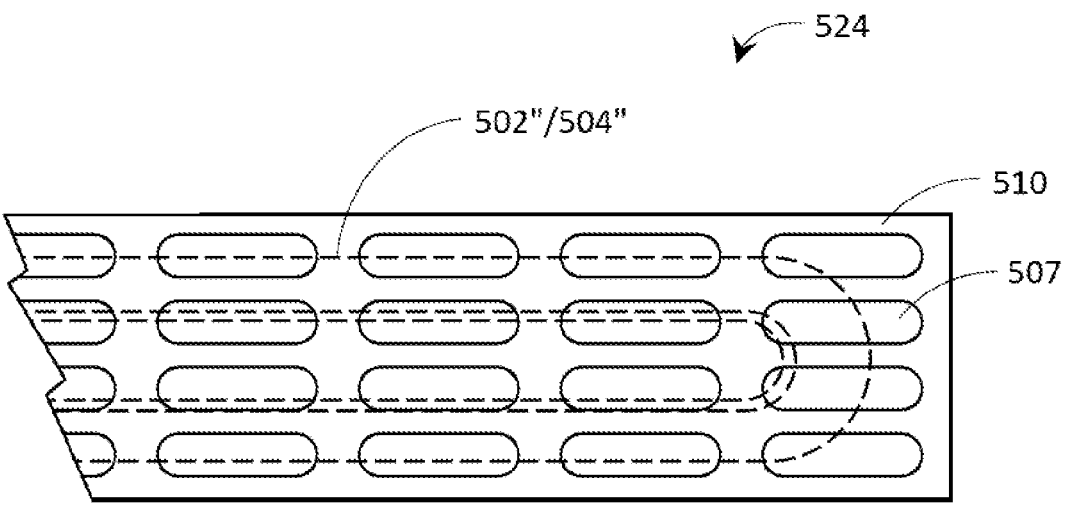
FIG. 8 is a fragmentary plan view of an electrically-conductive subassembly according to yet another exemplary embodiment, made according to the process described in FIGS. 5-7.

FIG. 8 illustrates a finished electrically conductive assembly 524 in plan view. As shown, conductive layer 510 is present as a continuous, foraminous layer that shares an exposed major surface with the insulating encapsulant 507. Insulating encapsulant 507, which is cured in this figure, is discontinuous along the exposed major surface but a continuous layer overall as revealed in the earlier figures. Underneath these layers is the conductive layer 502 and adhesive layer 504, shown in phantom lines. This layered construction allows for the conductive layers 502, 510 to be spatially separated while enabling an electric current to be sustained along separate, independent paths throughout the assembly 524.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An electrically-conductive assembly comprising:
a release liner having a major surface;
a conductive layer extending across a portion of the major surface according to a pre-determined shape;
a pressure-sensitive adhesive layer disposed between the release liner and the conductive layer, the pressure-sensitive adhesive layer being mutually coextensive with the conductive layer; and
an insulating layer disposed on, and in contact with each of, the conductive layer and the release liner, wherein the conductive layer and the pressure-sensitive adhesive layer are captured between the insulating layer and the major surface of the release liner.

2. The electrically-conductive assembly of claim 1, wherein the conductive layer and the pressure-sensitive adhesive layer are substantially encapsulated between the insulating layer and the major surface of the release liner.

3. The electrically-conductive assembly of claim 1, wherein an interface between the pressure-sensitive adhesive layer and the release liner is coplanar with an interface between the insulating layer and the release liner.

4. The electrically-conductive assembly of claim 1, wherein the conductive layer extends across the major surface according to a plurality of pre-determined shapes, the plurality of pre-determined shapes being discontinuous.

5. The electrically-conductive assembly of claim 1, wherein the conductive layer and the pressure-sensitive adhesive layer have peripheral edges, and wherein the insulating layer directly contacts the peripheral edges of both the conductive layer and the pressure-sensitive adhesive layer.

6. The electrically-conductive assembly of claim 1, wherein the conductive layer comprises copper, gold, silver, tin, aluminum, steel, or alloy or combination thereof.

7. The electrically-conductive assembly of claim 1, wherein the insulating layer comprises an epoxy, urethane, silicone, fluoroelastomer, polysulfide, polythioether, or combination thereof.

8. The electrically-conductive assembly of claim 1, wherein the conductive layer is a first conductive layer and further comprising a second conductive layer disposed on the insulating layer and spaced apart from the first conductive layer.

9. The electrically-conductive assembly of claim 8, wherein the second conductive layer and the insulating layer each have an exposed major surface, and further wherein the exposed major surfaces of the second conductive layer and the insulating layer are coplanar with each other.

10. The electrically-conductive assembly of claim 9, further comprising a carrier layer disposed on, and bonded to, the exposed major surfaces of the second conductive layer and the insulating layer.

11. The electrically-conductive assembly of claim 10, wherein the carrier layer comprises a paper and/or polymeric film.

12. A method of using the electrically-conductive assembly of claim 1, the method comprising:

removing the release liner from the pressure-sensitive adhesive layer;

adhering the pressure-sensitive adhesive layer to a substrate; and connecting the conductive layer to an electrical circuit.

13. The method of claim 12, wherein the substrate comprises a pressure-sensitive adhesive.

* * * * *